(12) United States Patent
Keshavaraj

(10) Patent No.: US 6,783,155 B2
(45) Date of Patent: Aug. 31, 2004

(54) AIR BAG TETHER CONSTRUCTION

(75) Inventor: Ramesh Keshavaraj, Peachtree City, GA (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 10/118,398

(22) Filed: Apr. 8, 2002

(65) Prior Publication Data

US 2002/0153717 A1 Oct. 24, 2002

Related U.S. Application Data

(60) Division of application No. 09/907,141, filed on Jul. 17, 2001, now abandoned, which is a continuation-in-part of application No. 09/549,284, filed on Apr. 14, 2000, now Pat. No. 6,315,324.

(51) Int. Cl.$^7$ ............................................. B60R 21/16
(52) U.S. Cl. .............................. 280/743.2; 280/728.1; 280/743.1
(58) Field of Search ........................... 280/743.1, 743.2, 280/728.1

(56) References Cited

U.S. PATENT DOCUMENTS

| | | | | |
|---|---|---|---|---|
| 4,966,389 A | | 10/1990 | Takada | 280/743 |
| 5,308,113 A | * | 5/1994 | Moriset | 280/743.2 |
| 5,393,092 A | | 2/1995 | Charns et al. | 280/743 |
| 5,607,182 A | * | 3/1997 | Nelsen et al. | 280/743.1 |
| 5,613,708 A | | 3/1997 | Bleider et al. | 280/743.2 |
| 5,669,632 A | | 9/1997 | Johnson et al. | 280/743.2 |
| 5,813,696 A | | 9/1998 | Hill | 280/743.2 |
| 5,848,805 A | | 12/1998 | Sogi et al. | 280/743.2 |
| 5,997,037 A | | 12/1999 | Hill et al. | 280/743.2 |
| 6,059,312 A | | 5/2000 | Staub et al. | |
| 6,086,095 A | * | 7/2000 | Keshavaraj | 280/728.1 |
| 6,086,096 A | | 7/2000 | Link et al. | 280/743.2 |
| 6,241,283 B1 | | 6/2001 | Zarazua | 280/743.2 |
| 6,254,130 B1 | | 7/2001 | Jayaraman et al. | 280/743.2 |
| 6,302,433 B1 | | 10/2001 | Ellerbrok et al. | 280/729 |
| 6,315,324 B1 | * | 11/2001 | Keshavaraj | 280/743.2 |

FOREIGN PATENT DOCUMENTS

| | | | |
|---|---|---|---|
| EP | 0 611 683 | 8/1994 | |
| GB | 2 243 119 | 3/1990 | |
| GB | 2 243 119 | 10/1991 | |
| JP | 3 197 255 | 8/1991 | |
| JP | 5-301553 | * 11/1993 | 280/743.2 |
| JP | 405301553 | 11/1993 | |
| JP | 5 319 191 | 12/1993 | |

OTHER PUBLICATIONS

International Search Report PCT/US02/19549 filed Jun. 20, 2002; Our docket No. 2178C for Air Bag Tether Construction.

* cited by examiner

*Primary Examiner*—Eric Culbreth
(74) *Attorney, Agent, or Firm*—Terry T. Moyer; John E. Vick, Jr.

(57) ABSTRACT

The present invention relates to air bag tethers and to a pattern-wise arrangement of such tethers in relation to air bag panels on a fabric blank, thus resulting in increased fabric utilization per tether and an overall cost savings per finished air bag. The air bag tether system of the present invention is comprised of two congruent tether panels that are joined to one another and to a respective air bag panel. In a preferred embodiment, the tether panel that is attached to the face panel of the air bag is cut in alignment with the warp and the fill of the fabric blank, while the rear tether panel that is attached to the rear panel of the air bag is cut on the bias with respect to the warp and the fill of the fabric blank. The two tether panels are then connected to one another to form a functional tether system. This two-piece construction, with one bias-cut piece, decreases the amount of fabric that is used in the manufacture of the air bag and tethers, while providing sufficient elongation for the tether system to be functional.

6 Claims, 7 Drawing Sheets

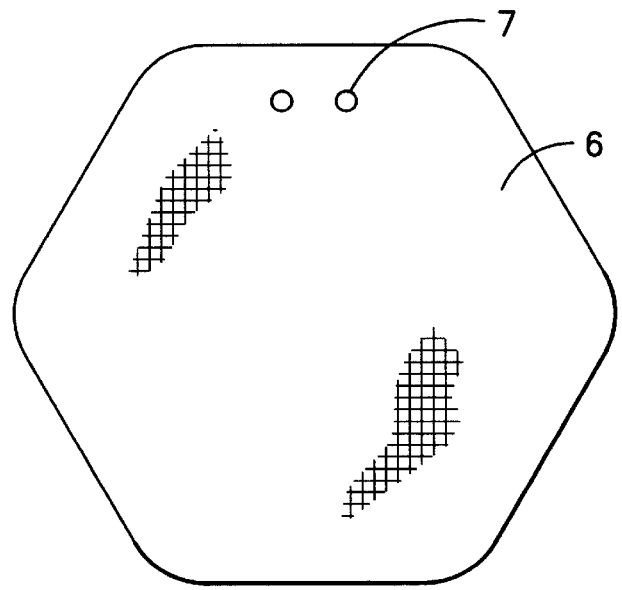
FIG. −1A−
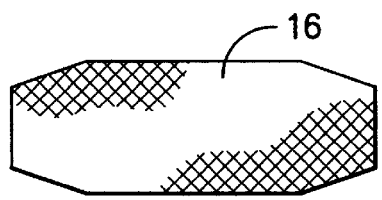
FIG. −1B−
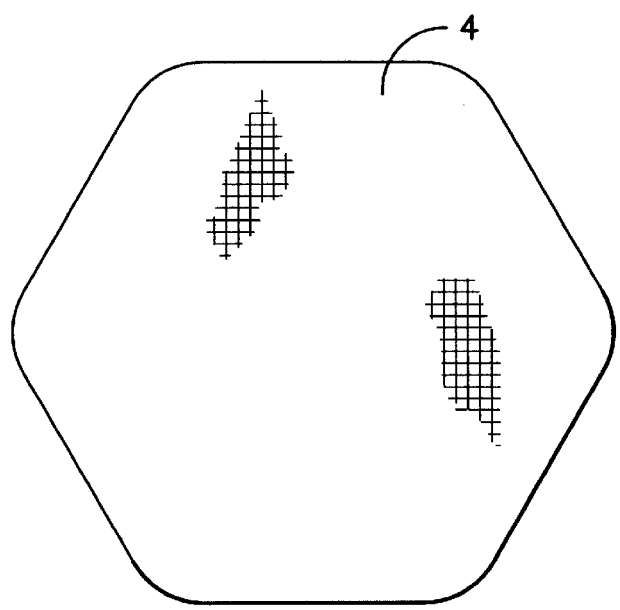
FIG. −1C−
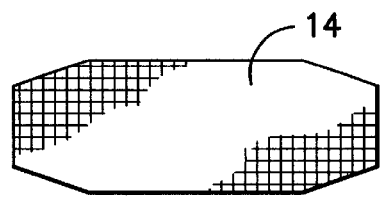
FIG. −1D−
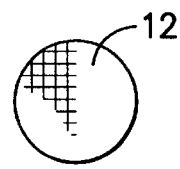
FIG. −1E−

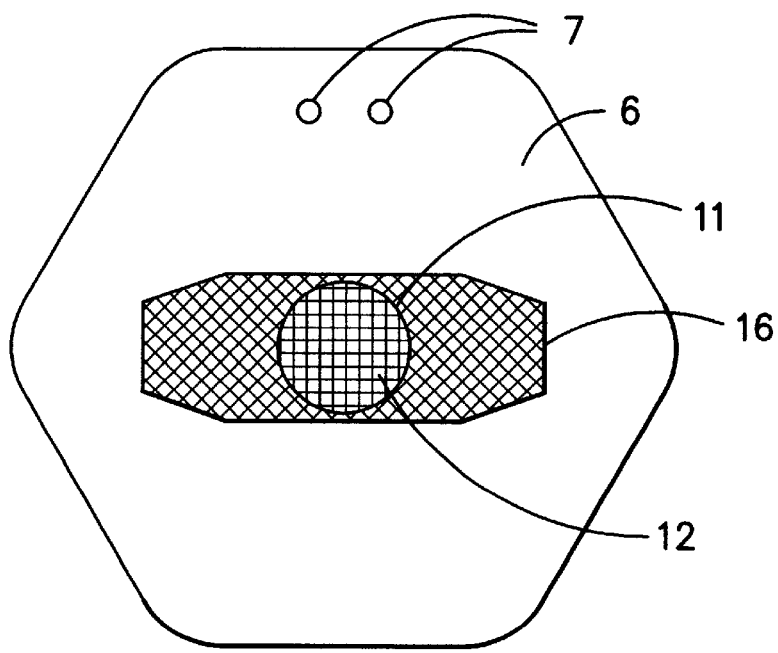
FIG. -2A-
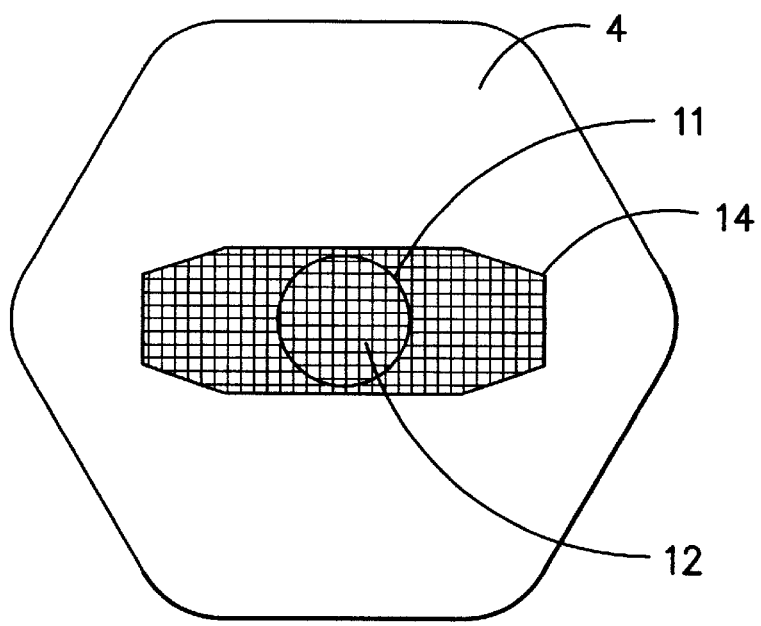
FIG. -2B-

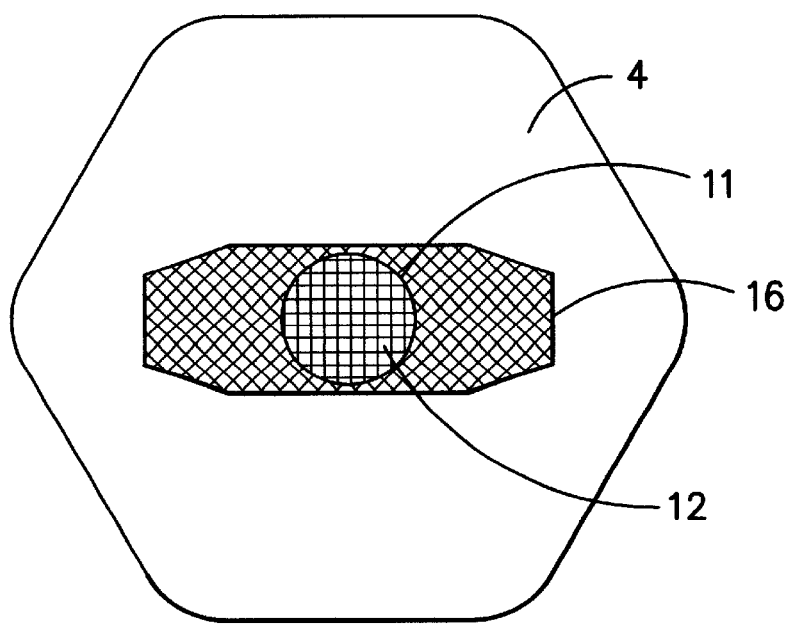
FIG. -2C-
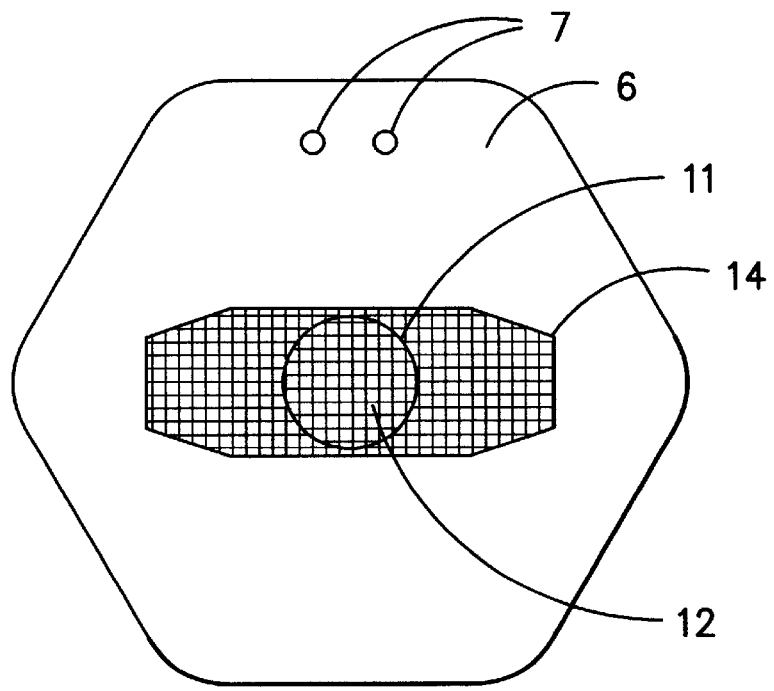
FIG. -2D-

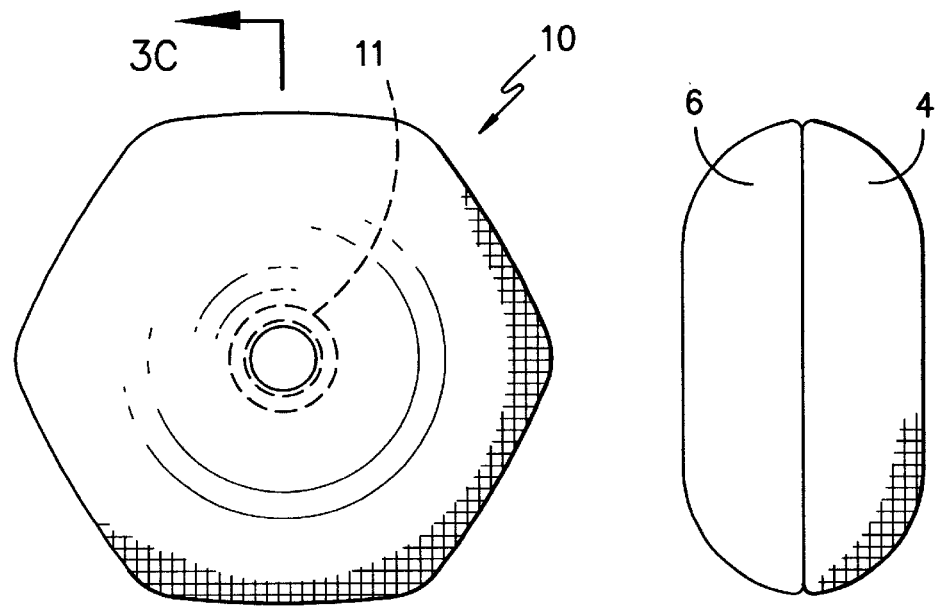
FIG. -3A-
FIG. -3B-
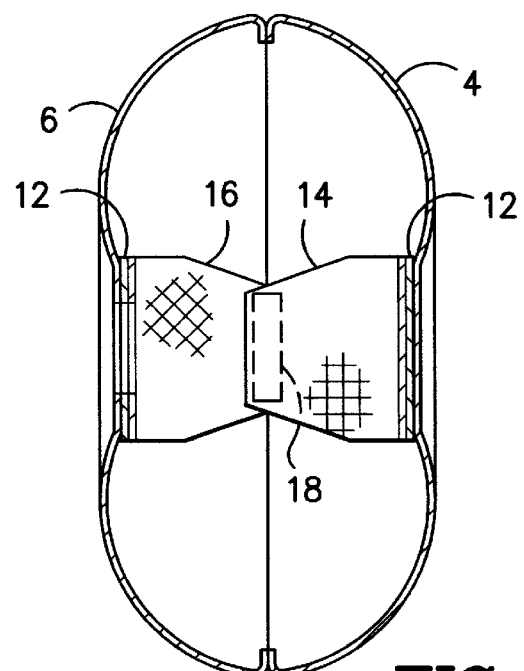
FIG. -3C-

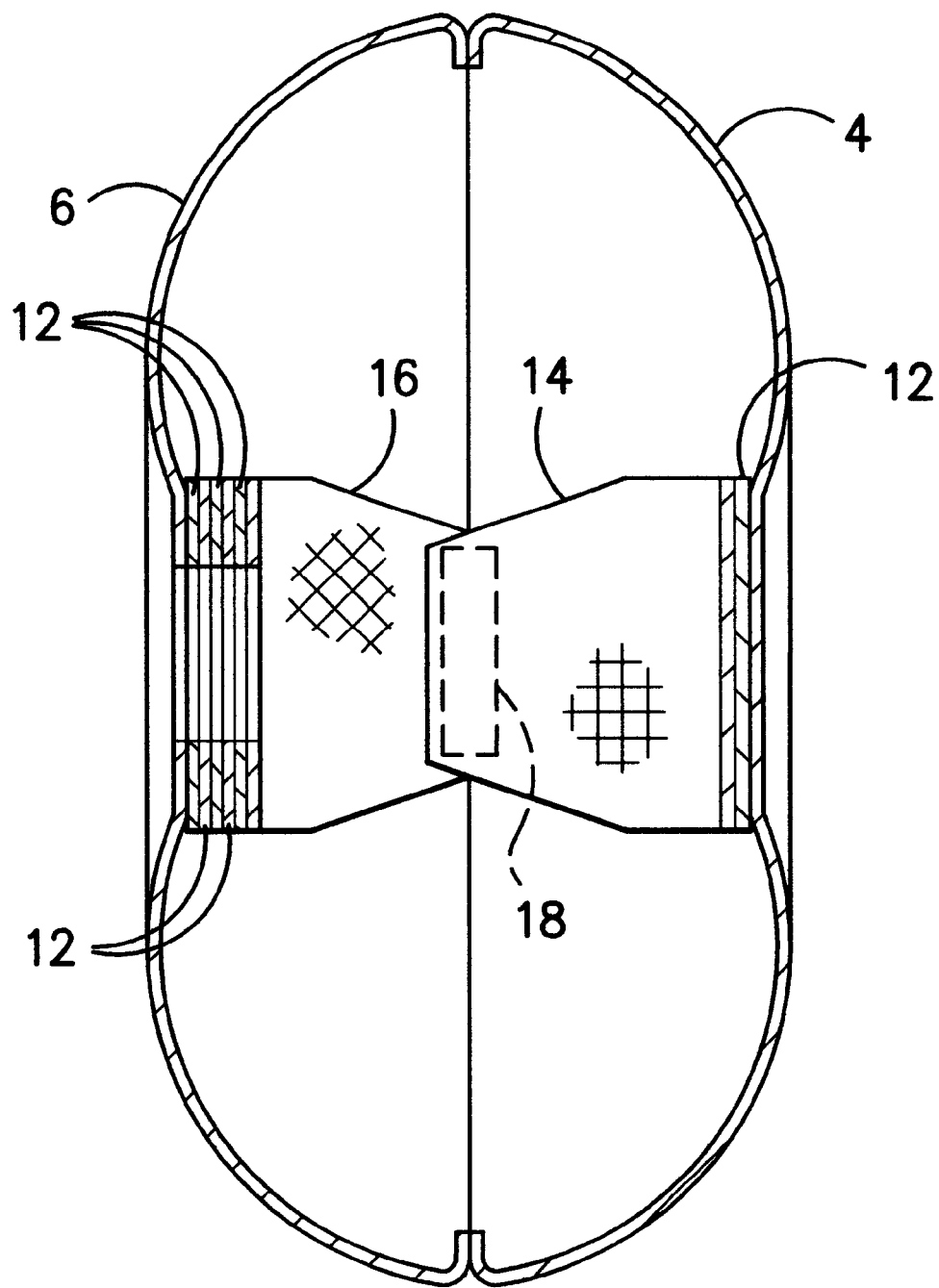
FIG. -3D-

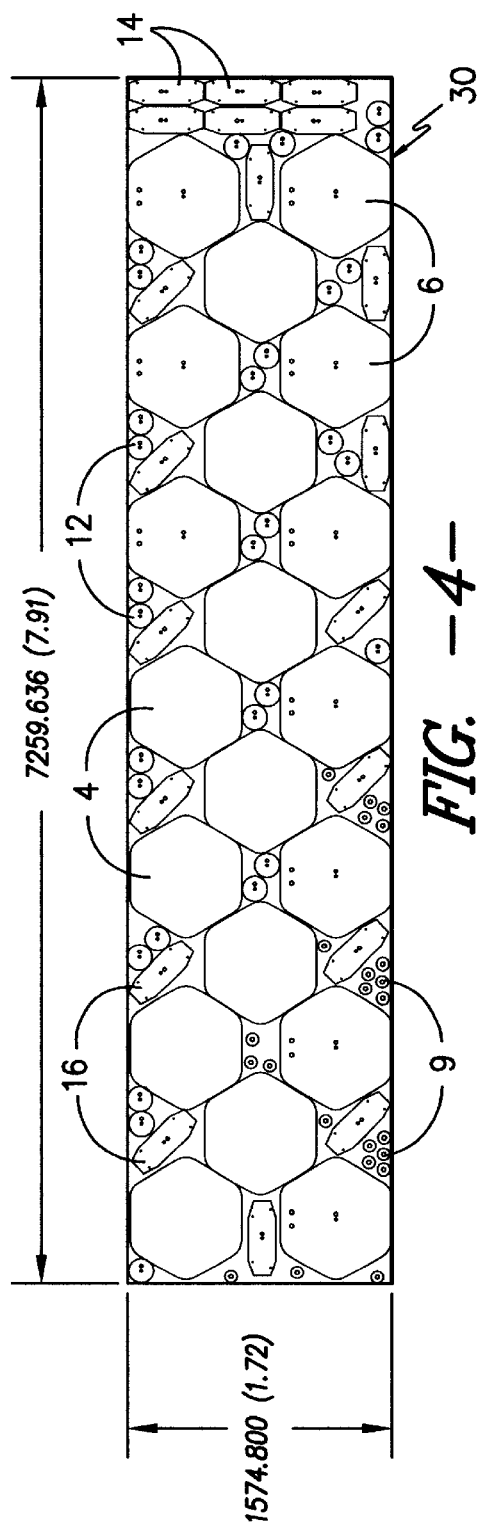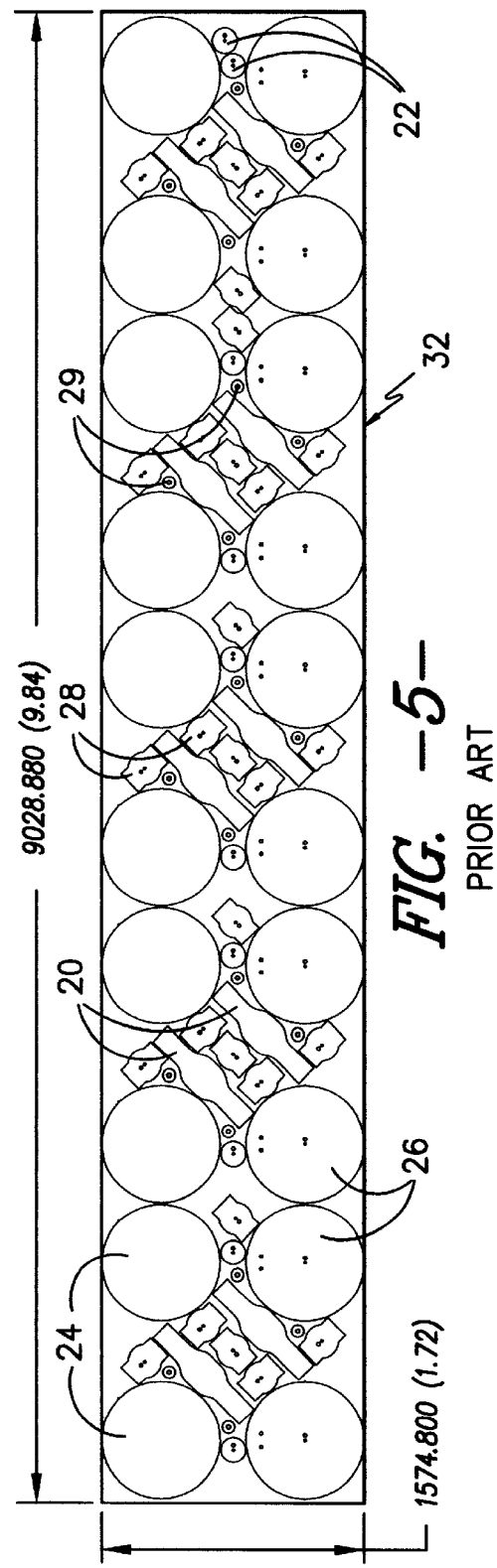
FIG. -4-
FIG. -5- PRIOR ART

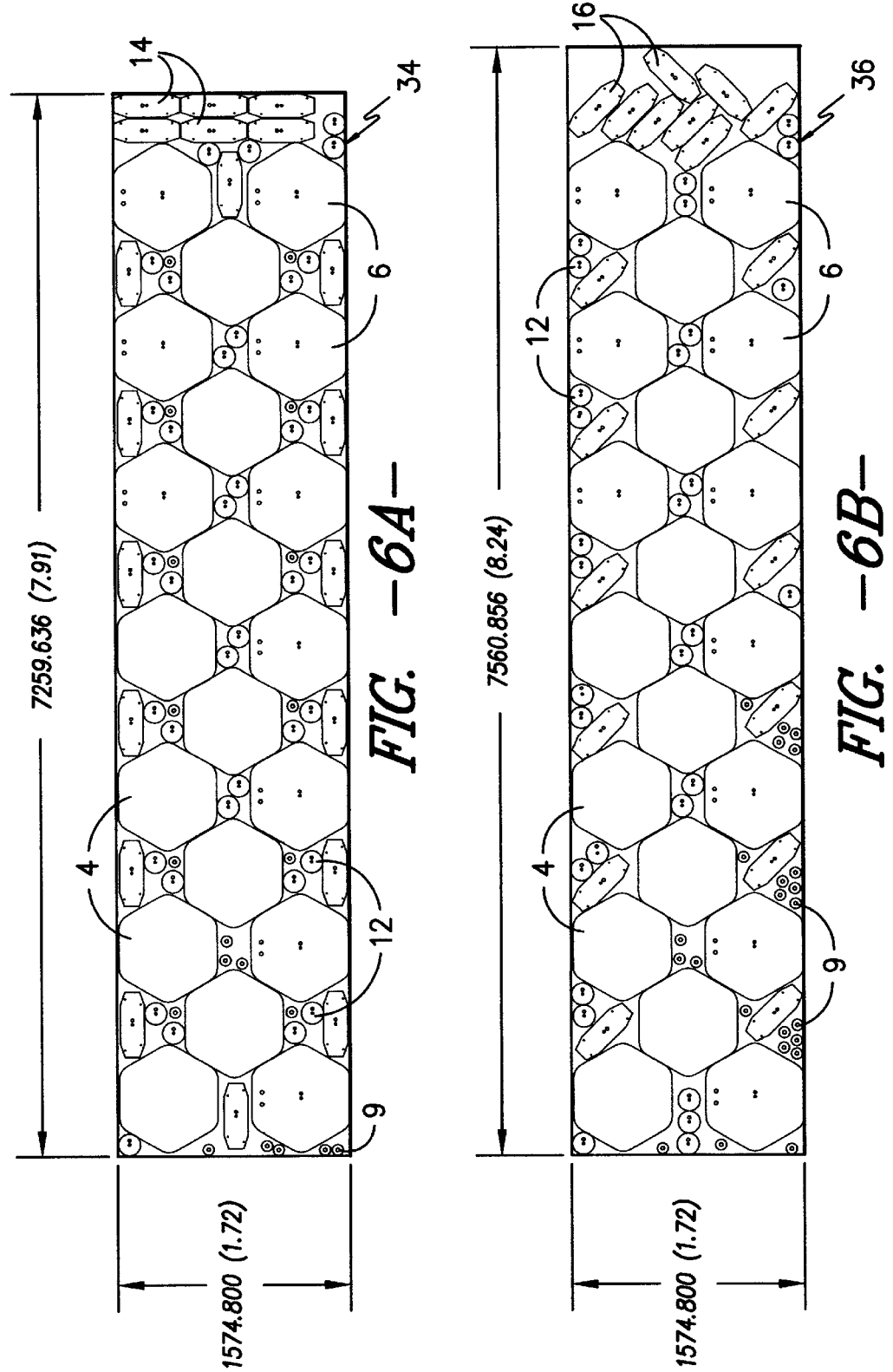

AIR BAG TETHER CONSTRUCTION

This application is a Divisional of U.S. application Ser. No. 09/907,141, filed Jul. 17, 2001 abandoned, which is a Continuation-in-part of U.S. patent application Ser. No. 09/549,284, filed Apr. 14, 2000 now U.S. Pat. No. 6,315,324.

TECHNICAL FIELD

The present invention relates to air bag tethers and to a pattern-wise arrangement of such tethers in relation to air bag panels on a fabric blank, thus resulting in increased fabric utilization and an overall cost savings per finished air bag. The air bag tether system of the present invention is comprised of two congruent tether panels that are joined to one another and to a respective air bag panel. In a preferred embodiment, the tether panel that is attached to the face panel of the air bag is cut in alignment with the warp and the fill of the fabric blank, while the rear tether panel (which is attached to the rear panel of the air bag) is cut on the bias with respect to the warp and the fill of the fabric blank. This two-piece construction, with one bias-cut piece, decreases the amount of fabric that is used in the manufacture of the air bag and tethers, while providing sufficient elongation for the tether system to be functional.

BACKGROUND

Traditionally, air bag tethers have been used to control the excursion of an air bag as it inflates. As gas is released, causing the air bag to rapidly inflate, it is necessary to keep such inflation from occurring in an uncontrolled manner. Tethers, which are sewn to the face and rear panels of an air bag, keep the inflating air bag from expanding so rapidly as to adversely affect the safety of the vehicle occupant, as the vehicle occupant contacts the air bag.

Tethers are conventionally strip-shaped pieces of fabric that are aligned in pattern-wise arrangement on a fabric blank, or are aligned in relation to air bag panels that may be cut from the same blank. The patterns for these tethers may include a circular portion in the center area of the tether strip around which the strip is attached to the air bag panel. It is understood that such tethers should have a capacity for elongation (that is, the tethers should be able to stretch to accommodate the rapid excursion of the bag). For this reason, conventional tethers have been cut on the bias with respect to the warp and fill of the fabric. However, aligning the tether patterns to fulfill this condition increases the amount of fabric needed to create an appropriate number of tethers for a plurality of air bags. Furthermore, because fabric utilization comprises more than fifty percent of the costs of a finished air bag, aligning the tethers in this manner increases production costs.

SUMMARY

The present invention addresses the problems of fabric utilization and tether elongation. By understanding that the portions of the tether that are connected to the rear panel typically J experience a greater level of stretch than the tether portions connected to the face panel, a fabric-saving solution was created. Instead of the entire tether length being cut on the bias, only that portion of the tether attached to the rear panel is cut on the bias. Using a two-piece tether system in which only the rear tether panel is cut on the bias increases fabric utilization by allowing these bias-cut tether portions to be arranged around air bag panels into spaces which otherwise would be considered fabric waste. The portion of the tether that is attached to the face panel is cut in alignment with the warp and fill of the fabric. The combination of the bias-cut and alignment-cut tether portions leads to an improved fabric utilization, while providing a tether system that is capable of sustaining the forces exerted by the inflating air bag.

BRIEF DESCRIPTION OF THE DRAWINGS

FIG. 1A shows an overhead, or plan, view of a rear air bag panel as might be used in the formation of an air bag;

FIG. 1B shows a plan view of a bias-cut tether panel of the present invention, as would preferably be attached to the rear air bag panel of FIG. 1A;

FIG. 1C shows a plan view of a front air bag panel as might be used with the air bag panel of FIG. 1A to form an air bag;

FIG. 1D shows a plan view of a tether panel of the present invention that is cut in alignment with the warp and fill of a fabric blank, as would be attached to the air bag panel of FIG. 1C;

FIG. 1E shows a plan view of a circular reinforcement as might be used with the tether panel of FIG. 1B or 1D;

FIG. 2A shows a plan view of the rear air bag panel of FIG. 1A, to which the tether panel of FIG. 1B and the circular reinforcement of FIG. 1E have been attached;

FIG. 2B shows a plan view of the front air bag panel of FIG. 1C, to which the tether panel of FIG. 1D and the circular reinforcement of FIG. 1E have been attached;

FIG. 2C shows a plan view of the front air bag panel of FIG. 1C, to which the tether panel of FIG. 1B and the circular reinforcement of FIG. 1E have been attached;

FIG. 2D shows a plan view of the rear air bag panel of FIG. 1A, to which the tether panel of FIG. 1D and the circular reinforcement of FIG. 1E have been attached;

FIG. 3A shows a plan view of the front of a completed air bag, using the air bag panels of FIGS. 1A and 1C;

FIG. 3B shows a side view of the completed air bag of FIG. 3A;

FIG. 3C shows a cross-sectional view of the air bag of FIG. 3A, as taken along line 3C—3C, and further shows the lapped relation of the tether panels of FIGS. 1B and 1D;

FIG. 3D shows a cross-sectional view of the air bag of FIG. 3A, as taken along line 3—3, and further shows the lapped relation of the tether panels of FIGS. 1B and 1D with additional reinforcements;

FIG. 4 shows a plan view of the arrangement of the air bag components of FIGS. 1A, 1B, 1C, 1D, and 1E on a fabric blank, in accordance with the teachings herein; and FIG. 5 shows a plan view of the arrangement of conventional air bag panels and tethers, in accordance with the teachings of the prior art;

FIG. 6A shows a plan view of an arrangement of the air bag components of FIGS. 1A, 1B, 1C, 1D, and 1E on a fabric blank, wherein the tethers are all cut substantially in alignment with the warp or fill of the fabric; and FIG. 6B shows a plan view of an arrangement of the air bag components of FIGS. 1A, 1B, 1C, 1D, and 1E on a fabric blank, wherein the tethers are all cut substantially on the bias at roughly a 45 degree angle Wth respect to the warp and fill of the fabric.

DETAILED DESCRIPTION

In order to describe the invention, it is necessary that certain terms be defined. The term "bias" is intended to refer to a line cut diagonally across the weave of a fabric, typically at an angle of 45 degrees with respect to the warp and fill. The term "front" shall refer to that portion of an air bag that is nearest a vehicle occupant, while the term "rear" shall refer to those portions of an air bag that are furthest from the vehicle occupant (e.g., in the case of front-seat air bags, nearest the windshield). The term "tether" shall refer to a strip-shaped piece of fabric utilized to prevent the uncontrolled excursion of an inflating air bag from adversely affecting a vehicle occupant with whom such a bag comes in to contact. The term "tether system" shall refer to a functional tether comprised of two or more joined tether panels, as in the case of the present invention.

Because of the speed with which an air bag inflates, it is necessary, for the protection of vehicle occupants, to control the volume of space that the air bag occupies in the vehicle cabin. Tethers accomplish this task by preventing the uncontrolled expansion of the air bag. Tethers are securely connected to the interior portions of the air bag, usually by sewing or other joining techniques.

FIG. 1A shows a rear air bag panel 6 that could be used in the creation of an air bag 10 (see also FIG. 3B). Panel 6 has the shape of a six-sided polygon for the purposes of discussion, but panels having other geometries, including those with straight or curved sides, could also be used as design specifications dictate. The positions of vent holes 7 may also be modified to meet design specifications.

FIG. 1B shows a bias-cut tether panel 16 that is suitable for attachment to rear bag panel 6, in accordance with the teachings herein. Tether panel 16 is substantially rectangular in shape, with slight truncation along each area where the right angles that form corners would otherwise be located. As stated above, it has been found that the portion of a tether that is connected to the rear of the air bag experiences the greatest stress and, as a result, needs the capacity to stretch to accommodate such stress. Tether panel 16 is capable of stretching to accommodate such stress, because tether panel 16 is cut on the bias of the fabric.

FIG. 1C shows a front air bag panel 4 that could be used in the creation of air bag 10 (see also FIG. 3B). Panel 4 has the shape of a six-sided polygon for the purposes of discussion, but panels having other geometries, including those with straight or curved sides, could also be used as design specifications dictate. It has been found that congruent panels having a like size and shape are most useful in creating air bag 10 (shown in FIGS. 3A and 3B).

FIG. 1D shows a tether panel 14 that is suitable for attachment to front bag panel 4, in accordance with the teachings herein. Unlike tether panel 16, tether panel 14 is cut in alignment with the warp and the fill of the fabric. As a result, tether panel 14 is less capable of elongation than tether panel 16. However, this elongation difference has not been found to be problematic. Tether panel 16 contributes the majority of the elongation that is necessary for the entire tether system, and the fabric that is saved by utilizing such a multi-piece tether system reduces production costs significantly. In a preferred embodiment, tether panel 14 is attached to bag panel 4 and bias-cut tether panel 16 is attached to bag panel 6. It is believed, however, that circumstances might arise in which it would be preferable for bias-cut tether panel 16 to be attached to bag panel 4.

It is common for reinforcements, having a circular or other shape, to be used in the production of air bags 10. Circular reinforcements 12, shown in FIG. 1E, are superimposed on tether panels 14, 16 in a central location. Such reinforcements 12 are particularly important in preventing tears around the mouth of air bag 10, at the location of the inflation media. The position of tether panel 16 and reinforcements 12 on bag panel 6 is shown in FIG. 2A. The circular area provided by seam 11 creates an identifiable area at which air bag 10 may be positioned with relation to the inflator. An opening for the inflator is then cut in tether panel 16, inside the perimeter defined by seam 11. Often, more than one reinforcement 12 is used with rear tether panel 16 on bag panel 6. The number of reinforcements 12 may vary from zero to five, with a preferred number being at least two, and a more preferred number being three.

Front bag panel 4 typically has one circular reinforcement 12 that is placed over front tether panel 14, but other numbers of reinforcements 12 may be used as desired. Both tether panel 14 and reinforcement 12 are attached to bag panel 4 by sewing seam 11 around the circumference of reinforcement 12. The relative positions of tether panel 14 and reinforcement 12 are shown in FIG. 2B. The circular area that is created by seaming around reinforcement 12 produces a slightly recessed area in the center region of air bag 10 when inflated, which provides a suitable surface for contact by a vehicle occupant.

FIG. 3A shows inflated air bag 10, as viewed from the vehicle occupant. Circular seam 11 is in the center portion of air bag 10, seam 11 sewn around reinforcement 12 (as previously described) to produce a slightly recessed area on front bag panel 4 of air bag 10. FIG. 3B is a side view of air bag 10, indicating the relative positions of front bag panel 4 and rear bag panel 6. FIG. 3C is a cross-sectional view of air bag 10, as taken along line 3C–3C of FIG. 3A. In order to produce a functional tether system, tether panels 14, 16 must be joined to one another. Tether panels 14, 16 are shown in lapped fashion in the interior of air bag 10. The joining of tether panels 14, 16 is shown as being achieved by means of rectangular seam 18, but such joining may be accomplished by any other means, such as welding or other seaming techniques. Air bag 10 is finished by sewing, or otherwise securing, panels 4, 6 along their coincident perimeter portions.

The layout of bag panels 4, 6, tether panels 14, 16, and reinforcements 12 on fabric blank 30 is shown in FIG. 4. The fabric blank 30 is 1574.800 mm (1.72 yards) wide by 7259.636 mm (7.91 yards) long. Vent reinforcements 9, which support the fabric surrounding vent holes 7 on rear bag panel 6, are also incorporated into the pattern-wise configuration of air bag components. It has been found that utilizing panels 4, 6 having straight edges allows for greater flexibility in the arrangement of components and an overall reduction in the amount of fabric not utilized in functional components. By way of example only, and not as a limitation, panels 4, 6 having six sides are illustrated. The separation of the conventional tether into two tether panels 14, 16 allows a greater number of air bag components to be produced from a smaller length of fabric, by nesting tether panels 14, 16 between bag panels 4, 6 into areas that would otherwise be considered fabric waste.

FIG. 5 shows a plan view of conventional one-piece tethers 20 as arranged on a fabric blank 32 with conventional circular panels 24, 26. The fabric blank 32 is 1574.800 mm (1.72 yards) wide by 9028.880 mm (9.84 yards) long. Reinforcements 22, 28, 29 on fabric blank 32 are also shown. Because tethers 20 are formed in accordance with the thinking that the entirety of tethers 20 must be cut on the bias, the amount of fabric blank 32 that must be used to create tethers 20 is considerably more than for the two-piece tether system of the present invention.

Conventional air bag panels 24, 26 often feature non-linear sides or irregular geometries, making it difficult to position tethers 20 on a bias between such panels 24, 26. Therefore, to arrange a plurality of such tethers 20 on a fabric blank 32 requires grouping tethers 20 in one area of blank 32 and cutting each tether 20 on a bias. The requirement that each tether 20 be cut on the bias (in order to achieve the desired elongation) results in an increased amount of fabric utilized per finished air bag 10 and an increased amount of fabric waste.

The multi-piece tether system includes a tether panel 14 that is cut in alignment with the warp and fill of fabric blank 30 and a tether panel 16 that is cut on the bias with respect to the warp and fill of fabric blank 30. By incorporating this multi-piece tether system, the present invention addresses the issues of fabric utilization and tether elongation, thus representing a useful advancement over the prior art.

Various tether systems were tested, and the results are reported in the three Examples below. The airbags of Examples 1–3 were formed in accordance with the nesting patterns shown in FIGS. 6A and 6B.

EXAMPLE 1

Two tether pieces were cut substantially in alignment with the warp or fill of the fabric, and both pieces were sewn together to form a tether system. The fabric usage for a single bag having a volume of 52 Liters was 1.36 square yards per bag. The burst pressure was measured at 13 Psi. This airbag was manufactured in accordance with the nesting pattern set forth in FIG. 6A.

EXAMPLE 2

Two tether pieces were cut substantially on the bias of the fabric, at roughly a 45 degree angle with respect to the warp and fill of the fabric, and both pieces were sewn together to form a tether system. The fabric usage for a single bag having a volume of 52 Liters was 1.41 square yards per bag. The burst pressure was measured at 23 Psi. This airbag was manufactured in accordance with the nesting pattern set forth in FIG. 6B.

EXAMPLE 3

One tether piece was cut substantially on the bias of the fabric, at roughly a 45 degree angle with respect to the warp and fill of the fabric, and one tether piece was cut substantially in alignment with the warp or fill of the fabric, and both pieces were sewn together to form a tether system. The fabric usage for a single bag having a volume of 52 Liters was 1.36 square yards per bag. The burst pressure was measured at 23 Psi. This airbag was manufactured in accordance with the nesting pattern set forth in FIG. 4.

The bag burst test procedure for Examples 1–3 was based on an Autoliv version of the ISO bag burst pressure procedure, published in an Autoliv publication of Aug. 10, 1994 entitled Bag Burst Test Procedure. The serial number for this test is SO044. Specifically, a test tank was pressurized to 125 Psi. An orifice plate with one 4-inch hole was used to mimic the gas flow rate from the inflator. Vents in the bags were plugged for testing with the same material as the bag. Plugs were sewn on the inside of the back panel to ensure that the vent hole was completely covered and sewn shut. The maximum pressure in the bag was recorded within 120 milliseconds of firing the inflation tank.

Table 1 below shows a comparison between four airbags. Airbag Numbers 1–3 are the airbags described in Examples 1–3 above, respectively. Airbag Number 4 is the prior art airbag having a one-piece tether system, where the single tether is cut on the bias in accordance with the nesting pattern shown in FIG. 5.

TABLE 1

|  | Airbag No. 1 | Airbag No. 2 | Airbag No. 3 | Airbag No. 4 |
|---|---|---|---|---|
| Cushion volume L | 52 | 52 | 52 | 52 |
| Tether alignment to warp/fill (Degrees) | 90° | 45° | 90°/45° | 45° |
| Tether | two panels | two panels | two panels | one panel |
| Fabric usage per cushion (square yards) | 1.36 | 1.417 | 1.36 | 1.69 |
| Average bag burst pressure (Psi) | 13 | 23 | 23 | 24 |

Table 1 shows that the tether system design described herein allows an airbag cushion to have roughly the same bag burst pressure and gas volume as a tether airbag system completely cut on the bias, but which requires substantially less fabric in the manufacture of each bag. Thus, a fabric savings (and a cost savings) is realized without sacrificing size or performance of the airbag cushion. From this table, it can be seen that the ratio between gas volume (measured in liters) and fabric usage (measured in square yards) ranges between about 36.7:1 and 38.2:1 for the present invention. The same ratio for the single bias-only bag of prior art as shown in Table 1 is about 30.7:1.

What is claimed is:

1. A method of manufacturing airbag cushions having tether systems, said method comprising the steps of:

providing a length of fabric;

cutting desired shapes from said fabric to serve as components of an airbag cushion, wherein some of said components comprise tethers, and wherein said airbag cushion components necessary to manufacture one complete airbag cushion are cut from less than 1.69 square yards of fabric; and attaching said components together to form an airbag cushion, wherein said airbag cushion includes a fully inflated volume of at least 52 liters and exhibits a burst pressure of at least about 13 Psi.

2. The method set forth in claim 1, wherein said tethers comprise at least two tether panels.

3. The method set forth in claim 1, wherein said airbag cushion components necessary to manufacture one complete airbag cushion are cut from less than 1.42 square yards of fabric.

4. The method set forth in claim 1, wherein said airbag cushion components necessary to manufacture one complete airbag cushion are cut from about 1.36 square yards of fabric.

5. A method of manufacturing airbag cushions, said method comprising the steps of:

(a) providing a fabric, said fabric being configured in a plane, said fabric being comprised of a group of warp yarns and a group of fill yarns, said warp yarns being oriented generally perpendicular to said fill yarns;

(b) cutting planar portions from said fabric, said planar portions including at least a first tether panel and a second tether panel, said tether panels having an elongated dimension along their length, wherein said first tether panel is cut such that the elongated dimension of said first tether panel is substantially aligned with one of said warp or fill yarns, further wherein said second tether panel is cut such that the elongated dimension of said second tether panel is substantially out of alignment with respect to the direction of both said warp yarns and said fill yarns;

(c) further cutting from said fabric airbag cushion components needed to manufacture at least one complete airbag cushion, wherein said fabric comprises less than about 1.69 square yards of fabric; and (d) assembling said first tether panel with said second tether panel, thereby forming a tether system; and (e) connecting said components together to form an airbag cushion, wherein said airbag cushion includes a fully inflated volume of at least about 52 liters and exhibits a burst pressure of at least about 13 Psi.

6. A method of forming an airbag cushion, said method comprising the steps of:

(a) providing a fabric blank having a warp yarn fiber direction and a perpendicular fill yarn fiber direction;

(b) cutting from said fabric blank multiple components adapted to form an airbag cushion, said components including at least a first tether panel and a second tether panel;

(c) wherein said first tether panel is cut from said fabric blank in a manner so as to provide a long dimension of said first tether panel that is in alignment with said warp or fill yarn direction of said fabric blank;

(d) wherein said second tether panel is cut from said fabric blank in a manner so as to provide a long dimension of said second tether panel which is out of alignment with said warp and said fill yarn directions of said fabric blank.

(e) attaching said components together to form an airbag cushion, wherein said airbag cushion includes a fully inflated volume of about 52 liters and exhibits a burst pressure of at least about 13 Psi; and (f) wherein all of said components collectively are cut from less than about 1.69 square yards of fabric.

* * * * *